United States Patent [19]

Schulz, Jr.

[11] 4,014,590
[45] Mar. 29, 1977

[54] REMOVABLE TRUCK BOX COVER

[76] Inventor: Chris E. Schulz, Jr., Corwith, Iowa 50430

[22] Filed: Nov. 3, 1975

[21] Appl. No.: 627,975

[52] U.S. Cl. .............................................. 296/100
[51] Int. Cl.² ........................................ B60J 11/00
[58] Field of Search ................ 296/100, 98, 137 B; 160/23 R

[56] References Cited

UNITED STATES PATENTS

| 3,041,104 | 6/1962 | Richard | 296/100 |
| 3,138,399 | 6/1964 | Hughes | 296/100 |
| 3,768,540 | 10/1973 | McSwain | 160/23 R |
| 3,806,185 | 4/1974 | Brandjord | 296/98 |
| 3,819,082 | 6/1974 | Rosenvold | 296/100 |
| 3,829,154 | 8/1974 | Becknell | 296/100 X |

Primary Examiner—Joseph F. Peters, Jr.
Assistant Examiner—R. Schrecengost
Attorney, Agent, or Firm—Lucas J. De Koster

[57] ABSTRACT

A truck box cover adapted to be pulled laterally across the box by means of transverse rods to cover and uncover the box. The device is actuated by a rotating shaft controlling sprocket and chain devices to pull or retract the canvas.

6 Claims, 5 Drawing Figures

REMOVABLE TRUCK BOX COVER

BACKGROUND AND SUMMARY OF THE INVENTION

This invention pertains to truck box covers and more particularly to a cover which can be readily pulled over or retracted from the box.

In the hauling of grain particularly, it is desirable to cover the open box of a truck so that the grain does not blow out of the box nor dust blow in. Truck boxes have long been covered by tarpaulins for this purpose. Occasionally fully enclosed boxes have been suggested also, but such construction is usually unduly expensive.

Generally, a tarpaulin is merely spread over the box by hand and is fastened at intervals by ropes or the like to fittings on the truck box. Various other devices have been proposed, most of them proposing some sort of collapsible cover.

My device uses the simplest cover — a piece of canvas — but provides a simple method of retracting or covering. The retraction allows substantially complete opening of the box for easy and quick filling and yet provides for full covering.

FIGURES

Figure 1:
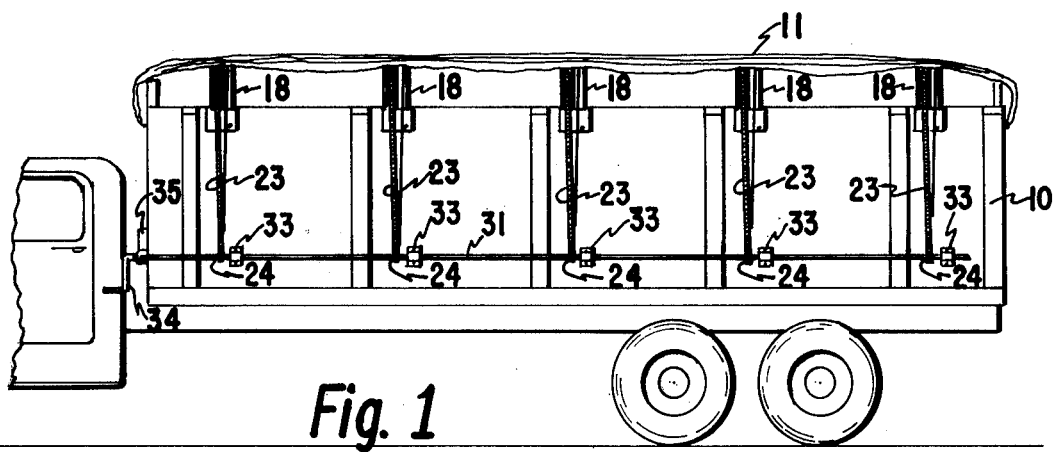
Figures 2, 3, 4:
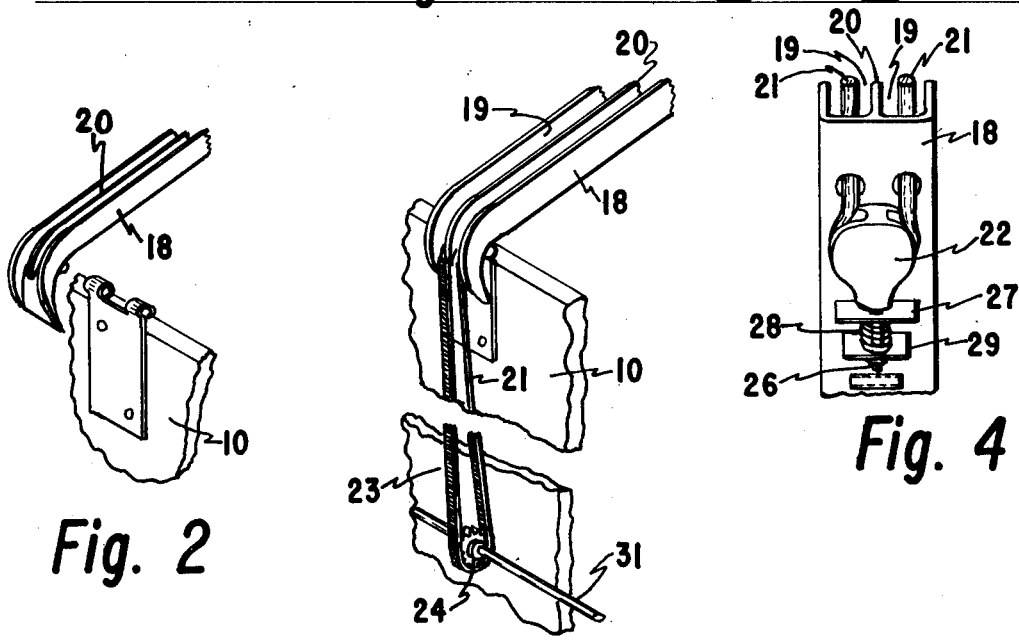
Figure 5:
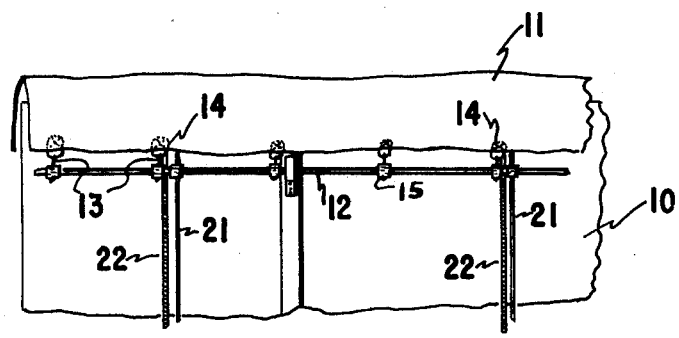

FIG. 1 is a side elevational view of a truck box with my cover in place in a nearly closed position, FIG. 2 is a detailed partial view of the end of one of the tracks of my device and the box to which it is fastened, FIG. 3 is a detailed partial view of a track and the box with the actuating means in place, FIG. 4 is a detailed partial view of the actuating means opposite the sprocket, FIG. 5 is a partial elevational view showing the mode of attachment of the cover to the actuating means.

Figure 6:
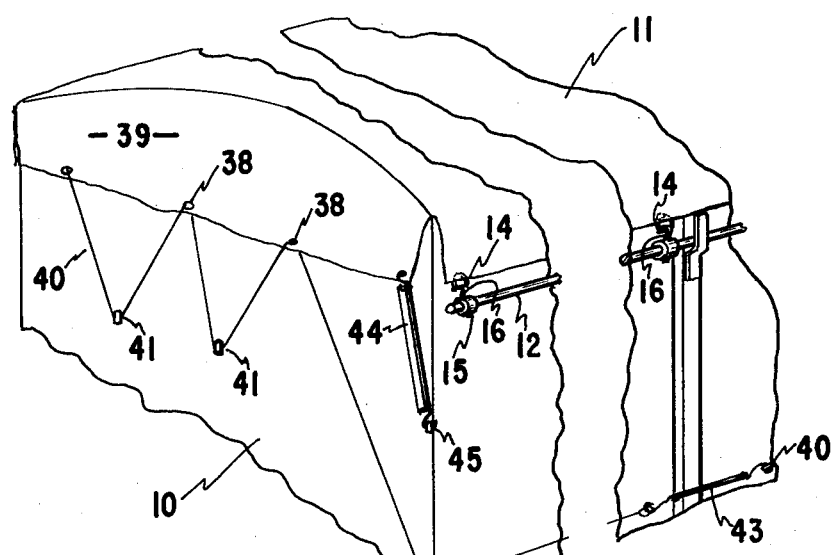
Figure 7:
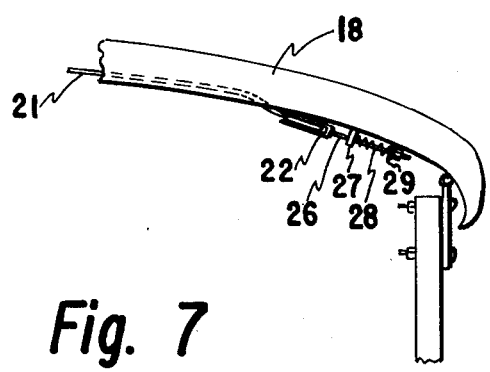

FIG. 6 is a pictorial view showing the fastening of the cover at the front of the truck, and FIG. 7 is a detailed elevational view of a track showing the attachment of pulling means.

DESCRIPTION

Briefly my invention comprises a cover for a truck box adapted to be pulled laterally over the box on transverse tracks longitudinally spaced along the box. A chain and sprocket arrangement provides pulling movement in both directions across the box so that the cover may be pulled to cover the box or to uncover it by positive action.

More specifically, my device is adapted for use with a truck box 10 which may be on either a straight truck or a trailer. A canvas cover 11 is adapted to fit over the box and is preferably formed to cover the ends of the box as well as the top and sides. In order for the device to operate best, I prefer that at least one of the longer, or longitudinal, edges of the cover be attached to a rod 12 by fastening means 13.

The fastening means I prefer to use is best shown in FIG. 6 and consists of loops 14 fastened to the edge of the cover 11. Fasteners consisting of a collar 15 slidably adjustable on the rod 12 and carrying hooks 16 are used to engage the loops 14. A set of screw or the like may be used to hold the collar 15 in place on the rod. By this means I provide for a readily detachable cover if desired. However, if more permanent fastening is desired, the hooks 16 could be replaced with closable loops or hooks having closures or the like.

At intervals along the length of the box I provide transverse tracks 18 removably attached to the box. The attachment may be a convenient hinge pin arrangement as shown in FIG. 2 with the pin removed. Each track 18 contains two channels 19 separated by a center wall 20. One of the channels provides a pathway for the cable or rope 21 or the like which is fastened at one end to the bar 12, or preferably to selected grommet or loop 14 (FIG. 5) on the cover. As illustrated in FIG. 5, not all of the fastening means are provided with these ropes. Each rope runs through its channel, and around a pulley 22 fixed to the track as shown in FIGS. 4 and 7. At the end of the rope opposite to its attachment to the cover, the rope is attached to a chain 22. The chain extends around a sprocket 24 and thence to an end fastened to the rope 21 or preferably to the loop 14, in effect making an endless loop.

The pulley 22 includes an attaching rod 26 extending slidably through a bracket 27 on the track member 18. In order to allow some adjustment of tension in the rope or cable 21, I prefer to provide a compression spring 28 surrounding the rod 26 and held by a collar 29. Further adjustment may be allowed by use of a threaded end on the rod 26 with the collar being threaded onto the end or by using a nut to adjust the position of the collar.

The sprockets 24 are all fixed to a longitudinal shaft 31 journalled in bearings 33 on the truck box 10. Rotation of the shaft 32 may be provided by a crank 34, although it will be obvious that a small geared motor might also be provided to drive the shaft. Ratchet means 35 may be provided to hold the shaft 31 in a closed position when the cover is pulled up tight across the top of the box.

The cover 11 may be fastened at front and back by the means shown in FIG. 6. Grommets 338 are spaced along a front flap 39 or similar rear flap and a rope 40 is laced through them. The rope is also looped through loops 41 on the end of the box 10. Hooks may be provided in place of the loops 41 if desired.

One end of the rope is fastened to the grommet near the fixed edge of the cover 11. The other end extends from the last or the next to the last grommet and then through an eye 42 near the corner of the box 10. From the eye, the rope runs along side the box and is fastened or hooked to a tension spring 43. A similar rope 40' holding the rear cover flap may be hooked to the opposite end of the spring 43.

In operation, the cover is originally retracted. In order to pull it over the box, all that is necessary is to turn the crank 25 in the direction that provides sprocket rotation to pull the chain 20 downward. This will pull the rod 12 slidably across the tops of the tracks 14 with the canvas cover 10 thus being extended. When the canvas is fully pulled over the top of the box, the ropes 40 and 40' are pulled from the loose position they occupy on a withdrawn cover. By pulling the ropes, the front flap 39 and its rear counterpart will be pulled down to properly enclose the box. When fully pulled down, the ropes are hooked to the spring 43 and the cover is secured. For better holding, I may provide an auxiliary rope 44 fastened to a grommet on the flap 39 and to a loop or hook 45 on the box to hold the corner of the flap.

To retract the cover, the reverse motion is all that is required. The chains 20 then pull the ropes 17 through the pulleys 19 to retract the cover. Thus, I provide an easy, quick and inexpensive means of covering or retracting the cover on a grain truck.

I claim:

1. A cover for a truck box, said box having opposite longitudinal edges, the cover comprising cover means adapted to cover said box attached at one longitudinal edge to said box, spaced apart track means attached at opposite longitudinal edges to said box and adapted to support said cover means, and pulling means connected to said cover means, at least some of said track means defining a pair of parallel channels, said pulling means being adapted to run in said channels, and pulley means between said channels at one end of each of the channelled track means around which said pulling means run so as to provide for opposite directions of motion of said pulling means in adjacent channels.

2. The device of claim 1 in which said pulling means include a chain, shaft and sprocket means rotatably mounted on said box on the side opposite said pulleys, said chain being engaged with said sprocket means whereby rotation of said sprocket means causes movement of said pulling means in said channels to pull said cover across said box.

3. The device of claim 2 in which said shaft and sprocket means is engaged by crank means whereby said shaft and sprocket means may be rotated.

4. The device of claim 1 in which said track means is releasably attached to said box.

5. The device of claim 2 in which front and rear flap means are provided on said cover, and looped rope means engaged between said cover and said box are adapted to hold said flap means in a closed position.

6. The device of claim 5 in which spring means is releasably engaged with said rope means to provide a resilient holding of said cover.

* * * * *